United States Patent [19]
Packer et al.

[11] Patent Number: 6,120,570
[45] Date of Patent: Sep. 19, 2000

[54] PROCESS FOR MANUFACTURING INSERTS WITH HOLES FOR CLAMPING

[75] Inventors: Scott M. Packer, Pleasant Grove, Utah; Peter Littecke, Huddinge, Sweden; David P. Denboer, Pleasant Grove, Utah

[73] Assignees: Smith International, Houston, Tex.; Sandvik Atibolag, Danvik, Sweden

[21] Appl. No.: 09/042,159

[22] Filed: Mar. 13, 1998

Related U.S. Application Data

[63] Continuation-in-part of application No. 08/601,631, Feb. 14, 1996, abandoned.

[30] Foreign Application Priority Data

Jul. 8, 1997 [SE] Sweden ................................ 9702661

[51] Int. Cl.$^7$ ........................................................ B24D 3/04
[52] U.S. Cl. ............................. 51/309; 51/307; 264/430; 264/313; 264/317; 419/5
[58] Field of Search .................... 264/430, 313, 264/317; 419/5; 51/309, 307

[56] References Cited

U.S. PATENT DOCUMENTS

| | | | |
|---|---|---|---|
| 3,743,489 | 7/1973 | Wentorf | 51/309 |
| 3,745,623 | 7/1973 | Wentorf | 29/95 |
| 3,918,931 | 11/1975 | De Vries | 51/309 |
| 3,992,202 | 11/1976 | Dulis et al. | 75/222 |
| 3,996,048 | 12/1976 | Fiedler | 419/5 |
| 4,383,854 | 5/1983 | Dembowski | 419/8 |
| 4,525,179 | 6/1985 | Gigl | 51/309 |
| 4,594,219 | 6/1986 | Hostatter | 419/8 |
| 4,761,191 | 8/1988 | Keller et al. | 148/12 R |
| 4,975,225 | 12/1990 | Vivaldi | 264/317 |
| 5,598,621 | 2/1997 | Littecke | 29/412 |
| 5,676,496 | 10/1997 | Littecke | 407/118 |

FOREIGN PATENT DOCUMENTS

| | | |
|---|---|---|
| 834827 | 5/1960 | United Kingdom . |
| WO 97/29885 | 8/1997 | WIPO . |
| WO 97/40777 | 11/1997 | WIPO . |
| WO 99/02289 | 1/1999 | WIPO . |

OTHER PUBLICATIONS

Japanese Abstract in English, JP58016003, Jan. 29, 1983.
GB 9905809.1, United Kingdom Search Report, Jan. 10, 1999.

*Primary Examiner*—James Derrington
*Attorney, Agent, or Firm*—Rosenthal & Osha L.L.P.

[57] ABSTRACT

According to the present invention there is provided a method of making a cutting insert with a hole for clamping to a tool holder wherein a super-hard abrasive material is sintered and simultaneously bonded to a sintered cemented carbide body with a hole inside a container under elevated pressure and temperature conditions. During sintering the hole is filled with a plug which after sintering is removed.

13 Claims, 4 Drawing Sheets

PROCESS FOR MANUFACTURING INSERTS WITH HOLES FOR CLAMPING

This is a continuation-in-part of U.S. application Ser. No. 08/601,631, filed Feb. 14, 1996, now abandoned.

FIELD OF THE INVENTION

The present invention relates to a high pressure/high temperature process for making polycrystalline diamond or cubic boron nitride cutting inserts and more particularly to cutting inserts with a hole formed therein.

BACKGROUND OF THE INVENTION

For the machining of several non-ferrous alloys like brass and magnesium, diamond is the best tool material, whereas cubic boron nitride (cBN) is very well suited for machining hardened steel, chilled cast iron, and cast iron at elevated speeds.

The cutting inserts used in such machining operations are either so-called PCD (polycrystalline diamond compact) or PcBN (polycrystalline cubic boron nitride compact) inserts, comprising a cemented carbide body with a diamond or cBN layer applied at such high temperature and pressure where the diamond or cBN is the stable phase or the inserts are provided with diamond or cBN bodies in at least one corner or along an edge generally fastened by brazing.

The method of manufacturing such inserts has been described in, e.g., U.S. Pat. Nos. 3,745,623; 3,743,489; 4,525,179; 5,589,621 and 5,676,496; and such descriptions are incorporated herein by reference.

Many inserts used for machining have holes in the center to ensure the best possible attachment to the tool holder. In the case of brazed inserts, this can be achieved by brazing a PCD/CBN tip to a body that already has a hole in it. Otherwise, the hole has to be cut afterwards, which is costly since cutting usually involves plunge EDM ("electro discharge machining") to start a small hole followed by wire cutting to make the actual size hole. In this way only straight-sided holes can be made. Holes cannot be cut to satisfy, e.g., holes with a chamfer section.

In a brazing process, a tungsten carbide body undergoes a thermal cycle and a PCD/CBN tip is bonded to the body by a brazing agent to form one cutting edge. To obtain multiple cutting edges, multiple thermal cycles are necessary. Because multiple thermal cycles tend to deteriorate the inserts, it is not desirable to apply multiple cutting edges by the brazing technique. Although multiple cutting edges may be made by the high pressure/high temperature sintering process on a carbide insert, post-sintering hole-drilling is necessary to form a hole in the carbide insert, which is time-consuming and expensive.

For the foregoing reasons, there exists a need for a hole-making process which is cost-effective and is capable of producing multiple cutting edges. Furthermore, it is desirable that such a process not subject inserts to multiple thermal cycles.

SUMMARY OF THE INVENTION

In accordance with one aspect of the invention, a method for making an abrasive structure with a hole, where the abrasive structure includes a substrate and a superhard material bonded together, includes 1) obtaining a substrate with a hole formed therein; 2) obtaining a plug having a body of a first material coated with a layer of a separating material which has a different composition from the first material; 3) positioning the plug inside the hole of the substrate to form an assembly; 4) placing a superhard material immediately adjacent to a surface of the substrate; and 5) subjecting the assembly and the superhard material to a pressure exceeding approximately 30 kilobars and a temperature exceeding approximately 1000° C. The method may further include one or more of the following: spraying a hexagonal boron nitride powder to cover at least a portion of the layer of the separating material prior to positioning the plug inside the hole of the substrate; attaching a non-carbide-forming metal disc to cover the hole after the superhard material is placed immediately adjacent to a surface of the substrate; and removing the plug from the hole of the substrate.

In some embodiments, the substrate is formed of a second material which has a compressibility that is approximately equal to or greater than the compressibility of the first material. In other embodiments, the first material includes one of cemented tungsten carbide, ceramics, cermets, graphite, and niobium. In some embodiments, the separating material includes one of copper, aluminum, niobium, zirconium, and TiCN. In preferred embodiments, the separating material includes TiCN and $Al_2O_3$. In some embodiments, the superhard material includes one of diamond and cubic boron nitride. In some other embodiments, the surface of the substrate is coated with the separating material. In still other embodiments, the non-carbide-forming metal includes one of aluminum and copper.

In accordance with another aspect of the invention, there is provided a method of making a cutting insert with a hole for clamping a tool holder wherein a superhard abrasive material is sintered and simultaneously bonded to a sintered cemented carbide body with a hole inside a container under elevated temperature conditions, the improvement wherein the hole during sintering is filled with a plug which after the sintering is removed.

In some embodiments, the plug includes one of ceramics and cermets. In preferred embodiments, the plug includes a cemented carbide. In more preferred embodiments, the cemented carbide of the plug has essentially the same composition as that of the body. In other embodiments, the plug may include a cemented carbide blank surrounded by a ceramic sleeve. In preferred embodiments, the ceramic sleeve includes one of $Al_2O_3$ and $ZrO_2$. In some embodiments, the superhard abrasive material includes polycrystalline diamond crystals. In other embodiments, the superhard abrasive material may comprise cubic boron nitride. Furthermore, the superhard abrasive material may also include a mixture that includes polycrystalline diamond crystals and CBN crystals. The superhard material may further include one of ceramics and cermets.

In accordance with yet another aspect of the invention, there is provided a method of making a cutting insert with a hole for clamping to a tool holder wherein a superhard abrasive material is sintered with a hole inside a container under elevated pressure and temperature conditions, the improvement wherein the hole during sintering is filled with a plug which after the sintering is removed.

In some embodiments, the plug includes one of ceramics and cermets. In preferred embodiments, the plug includes a cemented carbide. In more preferred embodiments, the cemented carbide of the plug has essentially the same composition as that of the body. Furthermore, the plug may include a cemented carbide blank surrounded by a ceramic sleeve. In preferred embodiments, the ceramic sleeve includes one of $Al_2O_3$ and $ZrO_2$.

In accordance with still another aspect of the invention, a high pressure/high temperature cell assembly for manufacturing an abrasive structure having a substrate and a superhard material bonded together includes 1) a substrate with a hole formed therein; 2) a plug having a body of a first material coated with a layer of a separating material and the plug being positioned inside the hole of the substrate; and 3) a superhard material placed immediately adjacent to a surface of the substrate.

In some embodiments, the high pressure/high temperature cell assembly further includes a hexagonal boron nitride layer sprayed on the layer of the separating material. In other embodiments, the high pressure/high temperature cell assembly further includes a non-carbide-forming metal disc attached to cover the hole.

Further aspects, features, and advantages will become apparent from the following description.

DESCRIPTION OF THE PREFERRED EMBODIMENTS

Figure 1:
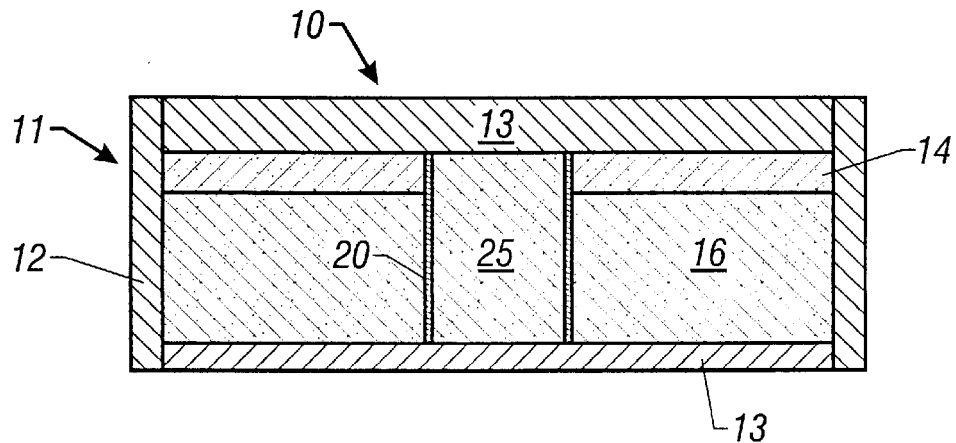
FIG. 1 is a cross-sectional view of a high pressure/high temperature cell according to one embodiment of the invention.
Figure 2:
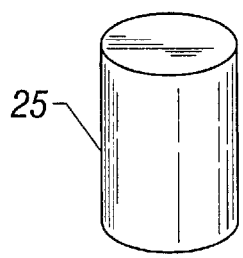
FIG. 2 is an exploded perspective view of the cell of FIG. 1.
Figure 2:
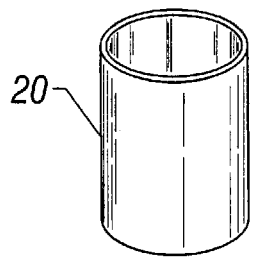
Figure 2:
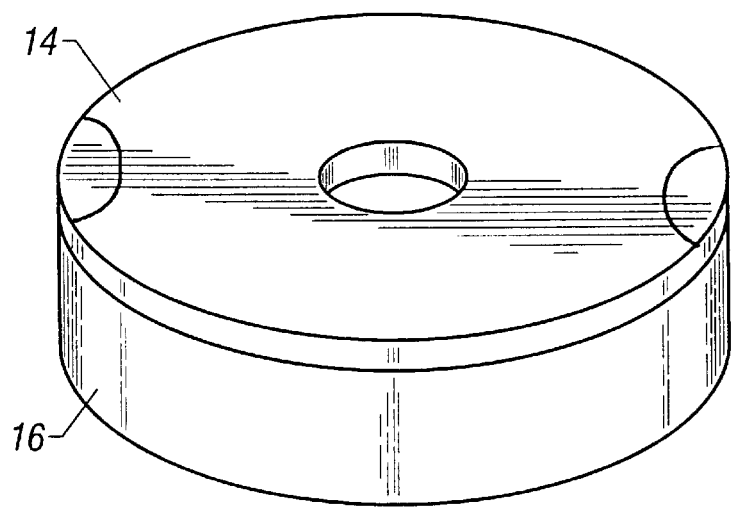

Techniques for simultaneously applying both high pressure and high temperature ("HP/HT") in this type of apparatus are well known in the art. Referring now to FIG. 1, the HP/HT-cell 10 fits within the space in the apparatus subjected to HP/HT conditions. The assembly consists of a can 11 comprising a cylindrical sleeve 12 and caps 13 of shield metal selected from a group consisting of Zr, Ti, Ta, Nb and Mo.

A sintered cemented carbide blank 16 with a hole in it is placed in the cup 12. The hole can be cylindrical, but it can also have other shapes such as completely or partly tapered or chamfered on one or both sides of the blank. The hole is provided with a plug with the same geometry as the hole. Preferably, the plug 25 consists of cemented carbide preferably with essentially the same composition as that of the cemented carbide blank or ceramic surrounded by a ceramic sleeve 20, such as $Al_2O_3$, with a wall thickness of 0.25–0.5 mm. The ceramic sleeve acts as a diffusion barrier to prevent sintering between the plug material and the blank. Generally, the ceramic sleeve has a thin wall of about 0.25 mm. In addition to $Al_2O_3$, other non-carbide-forming oxides such as zirconium oxide may be used.

A mixture containing diamond or cBN powder is filled into the cell, e.g., so as to form a top layer 14 or in grooves as disclosed in U.S. Pat. Nos. 5,598,621 and 5,676,496 or in any other desirable way. The cell is closed and placed in the HP/HT apparatus. The pressure and temperature is increased to the area where diamond or cBN is stable for a sufficient time for sintering to occur. The charge is then allowed to cool under pressure for a short period of time and after the pressure is relieved the compact is recovered.

The plug may be removed mechanically by a hydraulic press. In a preferred embodiment, the cemented carbide plug 25 can be reused. Finally, the compact is ground to desired final shape, circular, triangular or square, and dimension.

In other embodiments, the following method is used to make an abrasive structure with a hole formed therein: 1) forming a desired hole in a substrate; 2) making a plug from a material that preferably has a compressibility that is similar to or less than the compressibility of the substrate material; 3) coating the plug with another material ("separating material"); 4) placing the plug inside the hole of the substrate to form an assembly; 5) placing a layer of super-hard material immediately adjacent to the substrate; and 6) subjecting the assembly and the superhard material to a pressure and temperature high enough to bond the superhard material to the substrate. Optionally, the entire surface of the substrate is also coated with the separating material.

An abrasive structure refers to a structure that includes a substrate and a superhard material that is bonded to the substrate. A substrate can be made of any material, such as carbides, ceramics, and cermets. In a preferred embodiment, cemented tungsten carbide in a cobalt matrix is used. A superhard material generally refers to diamond or boron nitride. It may also include other materials with comparable or better hardness. Such other materials may include mixtures of diamond and CBN, mixtures of diamond and tungsten carbide, mixtures of diamond with ceramics or cermets, mixtures of CBN with tungsten carbide, mixtures of CBN with ceramics or cermets, certain carbides, nitrides, and diamond-like carbide. The abrasive structure may have one or more cutting edges formed by the superhard material. The abrasive structure is generally in the shape of a cylinder with a hole formed in the center along its cylindrical axis, although other locations and orientations of the hole are acceptable, depending on desired applications.

The hole formed in the substrate is generally cylindrical, but it can also have other shapes such as completely or partially tapered or chamfered on one or both sides of the substrate. The hole is preserved by placing a plug inside the hole that has the same geometry as the hole. The function of the plug is to support the hole during the high pressure/high temperature process. To achieve this function, it is preferable that the compressibility of the plug is similar to or less than the compressibility of the substrate material. It should be understood that compressibility is the reciprocal of bulk modulus of a material. In some embodiments, the same cemented tungsten carbide is used for both the substrate and the plug. It should be noted that plugs made of a material having a higher compressibility than that of the substrate may also be used, albeit less efficacious. Such materials include alumina, graphite, niobium, etc.

Although it is essential to provide a plug to preserve the integrity of the hole during the high pressure/high temperature process, it is also important to be able to remove the plug from the hole after the high pressure/high temperature process.

To facilitate removal of the plug, a thin layer of separating material is coated to the outer surface of the plug. "Separating material" refers to any material that has one or more of the following properties: 1) it adheres and has good bonding to the plug; 2) it does not allow sintering between the plug and the substrate; 3) it prevents sintering between the substrate and the cylindrical sleeve; and 4) it is durable so that there is no failure during a coating process. Furthermore, after the separating material is coated to a plug or a substrate, it is preferable that the coating is thin and has no cracks. To reduce production costs, it is desirable that the separating material is cheap. A variety of materials can be used as separating material. They include, but are not limited to, copper (coated or plated), aluminum, and any oxides that do not form carbide. Such oxides include aluminum oxide and zirconium oxide.

In a preferred embodiment, titanium carbonitride (TiCN) is deposited by chemical vapor deposition (CVD), although other suitable deposition processes are also acceptable. The thickness of the coating is not critical so long as it functions as a separating layer. In a more preferred embodiment, a cemented tungsten carbide plug is coated with a layer of titanium carbonitride of a thickness in the range of about 4–6 $\mu$m.

In addition, a layer of aluminum oxide ($Al_2O_3$) of a thickness in the range of approximately 2–4 $\mu$m is deposited by chemical vapor deposition onto the TiCN layer. It is found that aluminum oxide functions well as separating material, but it does not adhere strongly to cemented tungsten carbide. On the other hand, TiCN adheres both to cemented tungsten carbide and $Al_2O_3$. Therefore, a cemented tungsten carbide plug coated with a layer of TiCN and an additional layer of $Al_2O_3$ can be easily removed from the hole of the substrate after the high pressure/high temperature process. In addition to the TiCN/$Al_2O_3$ configuration, a cemented tungsten carbide coated by a copper film of a thickness in the range of a few microns was also found suitable.

In a more preferred embodiment, hexagonal boron nitride (HBN) is painted or sprayed onto a TiCN/$Al_2O_3$-coated plug to form a thin film. This thin film of HBN further facilitates removal of the plug after the high pressure/high temperature process. In some embodiments, plugs sprayed or coated only with HBN were used without depositing a layer of the separating material.

In some embodiments, it is also desirable to coat the entire surface of a substrate, including the inside surface of the hole, with a layer of TiCN and a layer of $Al_2O_3$ to increase the yield of plugs that can be removed from high pressure/high temperature process cell assemblies.

Figure 3:
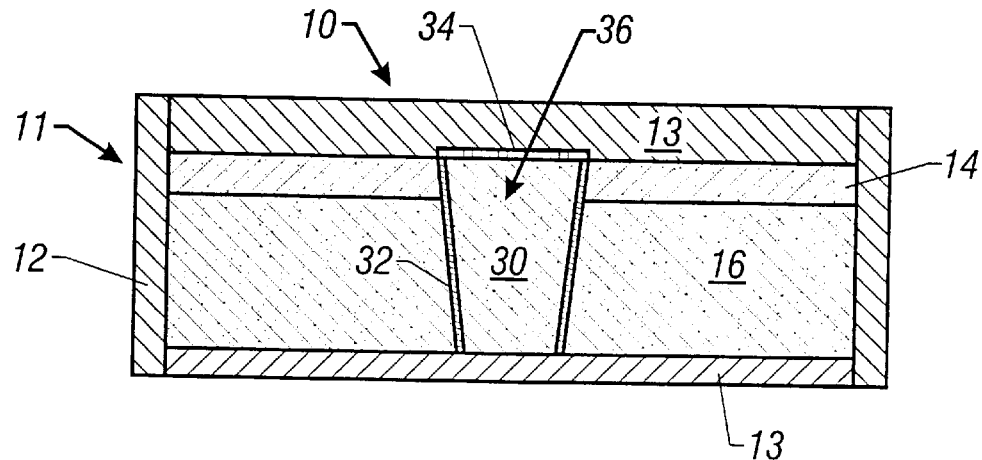
FIG. 3 is a cross-sectional view of a high pressure/high temperature cell according to another embodiment of the invention.
Figure 4:
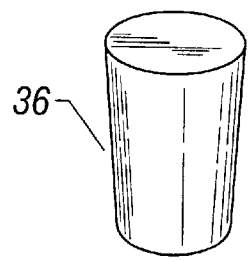
FIG. 4 is an exploded perspective view of the cell of FIG. 3.
Figure 4:
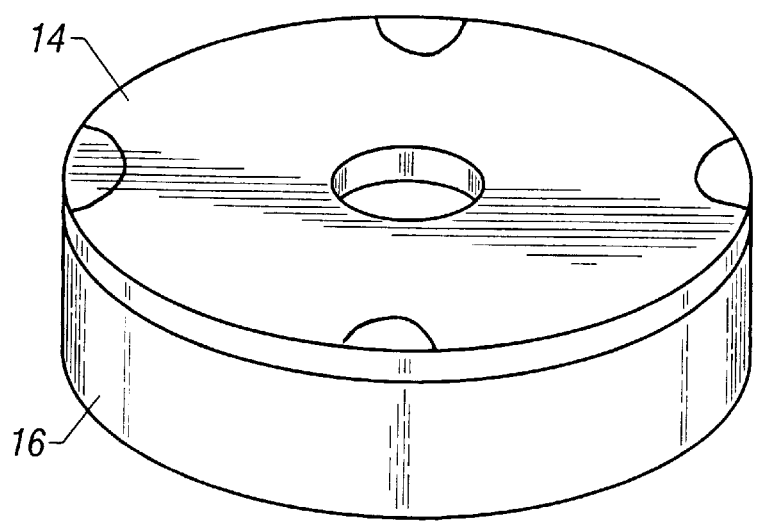

After a hole is formed in a substrate and a suitable plug is prepared, a high pressure/high temperature cell assembly is constructed. FIG. 3 illustrates a cross-sectional view of a high pressure/high temperature cell assembly according to one embodiment of the invention. Referring to FIG. 3, a tapered hole is formed in a cemented tungsten carbide substrate with a 0.6° taper angle, although other degrees of taper are also possible. It is found that a tapered hole with a tapered plug resulted in a higher yield of plugs being pushed out of high pressure/high temperature cell assemblies. FIG. 4 is an exploded perspective view of the substrate and the plug of FIG. 3.

A cell assembly 11 includes a substrate 16 which fits snugly into a sleeve 12. A coated plug 36 fits snugly inside of the substrate 16. The plug 36 is longer than the height of the substrate 16 so that part of the plug extends outside the substrate 16 so that a space is formed between the extended portion of the plug and the sleeve 12. A layer of superhard material 14 is formed by placing powder of the superhard material in the space formed by the plug 36 and the sleeve 12. To prevent extrusion of the metal can material such as Nb, a copper disc is placed on top of the hole. Alternatively, a copper cap or strip may be used to cover the hole to prevent sintering of the superhard material to the plug. In addition to copper, any other non-carbide-forming metals that have a lower melting point than the sleeve material such as Nb or other materials, e.g., adhesive paper cover, aluminum foil or niobium foil, may also be used. After the copper disc is attached to cover the hole, shield metal caps 13 are used to seal the cell assembly. The cell assembly is subsequently placed in a high pressure/high temperature apparatus and is subjected to a pressure and temperature high enough to sinter the superhard material so as to form a bond between the superhard material and the substrate. Typical sintering conditions are as follows: pressures are in the range of about 45 to 55 kilobars and temperatures are in the range of about 1300 to 1400° C. Sintering time is about 5 to 15 minutes.

Figure 5:
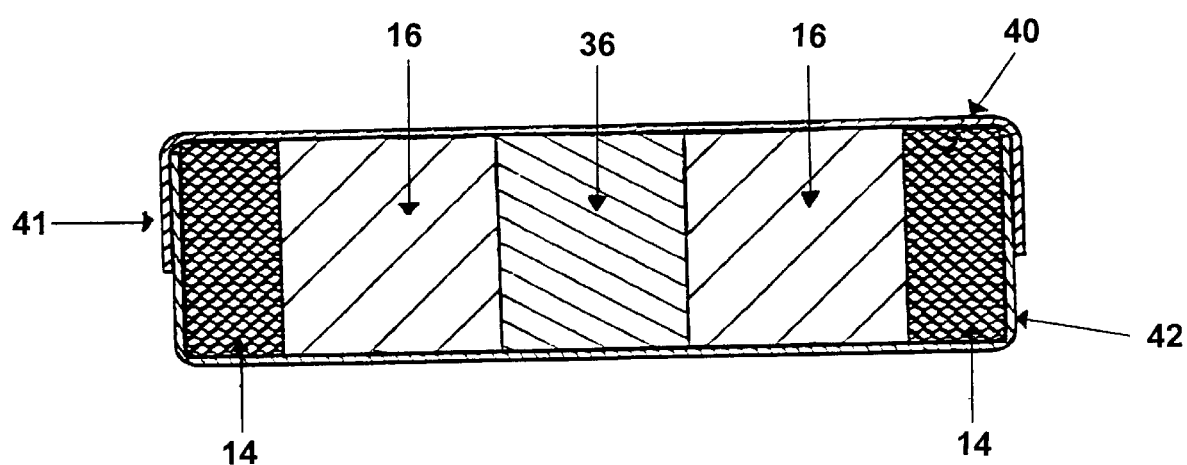
FIG. 5 is a cross-sectional view of a high pressure/high temperature cell according to still another embodiment of the invention.
Figure 6:
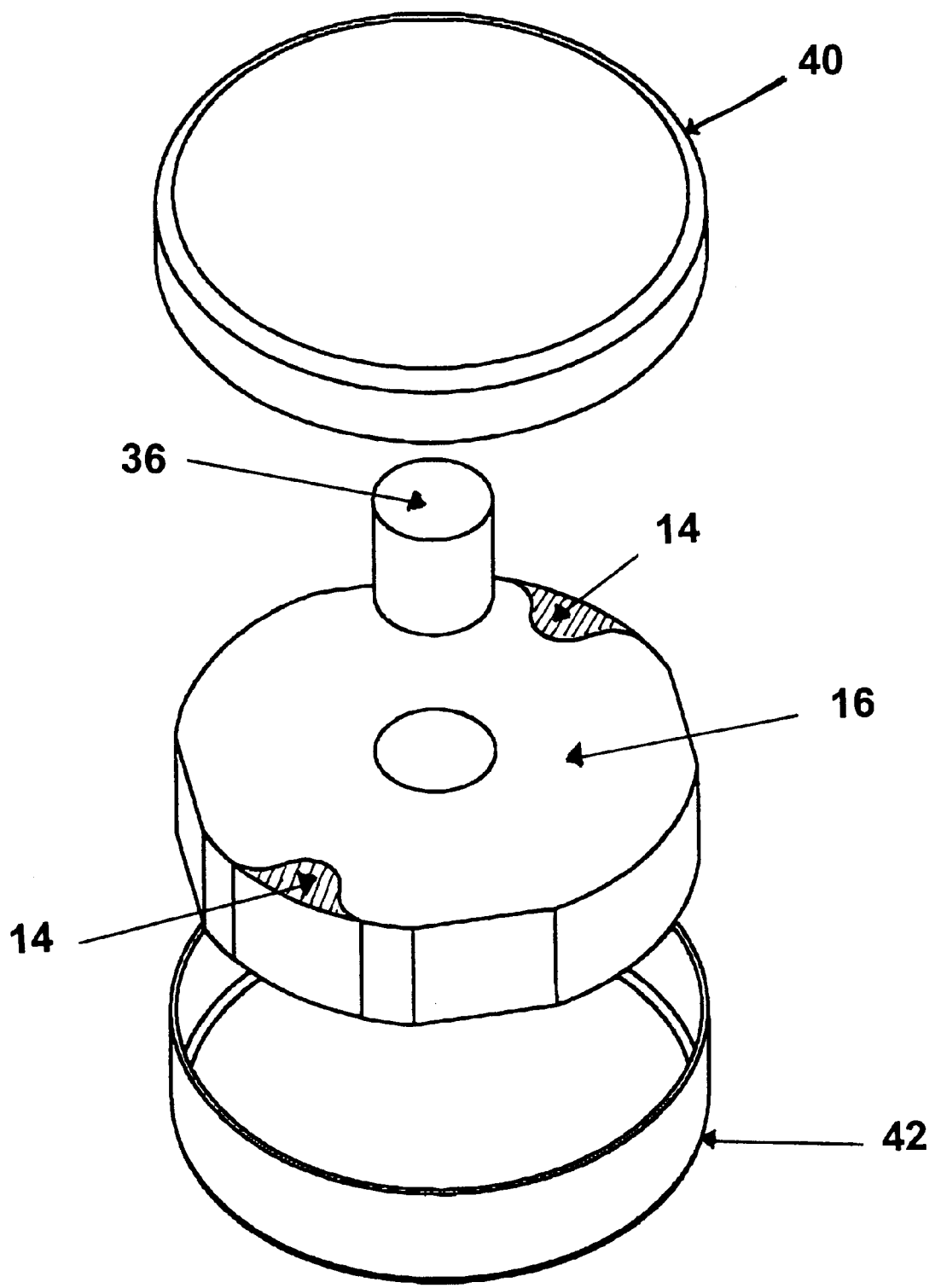
FIG. 6 is an exploded perspective view of the cell of FIG. 5.

In some embodiments, the orientation of the layer of the superhard material parallels to that of the hole. FIGS. 5–6 illustrate these embodiments. In FIG. 5, layers 14 of a superhard material is placed next to a substrate 16, which has a hole in it. The layer 14 parallels the orientation of the hole. A plug 36 coated with a separating material is positioned inside of the hole. A bottom can 42 and a top can 40 are used to seal the assembly 41. Such an assembly is subsequently placed in a high pressure/high temperature apparatus.

It should be understood that any apparatus that is capable of generating at least 30 kilobars and at least 1000° C. may be used in embodiments of the invention.

The following examples are illustrative of embodiments of the invention and are not restrictive of the invention as otherwise described herein.

EXAMPLE 1

A cemented tungsten carbide cylinder disc was prepared with a composition WC+16 wt % Co with a diameter from 20–22 mm and a thickness of about 6 mm and a central hole with a diameter of 3.8–5 mm and with 2–4 grooves equidistantly located along the peripheral surface of the blank. The cemented carbide disc had been coated with TiCN/$Al_2O_3$ over entire surface area of the blank. The plug that was placed in the center was the same composition as the carbide disc and had also been treated with a TiCN/$Al_2O_3$ coating over the entire surface area. The grooves had an essentially semicircular cross-section with a diameter of about 4 mm. The cemented carbide disc was placed in a refractory metal cup. A treated plug that had been sprayed with hexagonal boron nitride was placed into the center hole of the disc and both sides covered with a copper strip to ensure that no superhard material got into the clearance area between the disc and plug during loading of the superhard material. The grooves were then filled with a cBN powder mixture with a composition corresponding to Megadiamond commercial grade MN50 or MN90, and the disc and plug were then sealed and treated at a high temperature/high pressure process according to U.S. Pat. No. 5,115,697. After cooling, the inserts were recovered and processed in a solution of liquid KOH to remove the Nb can. The plug in the center of the disc was pressed out of the insert with a hydraulic press at less than 500 psi gauge pressure.

EXAMPLE 2

A cemented tungsten carbide cylinder disc was prepared with a composition WC+16 wt % Co with a diameter from 20–22 mm and a thickness of about 6 mm and a central hole with a diameter of 3.8–5 mm and with 2–4 grooves equidistantly located along the peripheral surface of the blank. The cemented carbide disc was not coated with any material.

The plug that was placed in the center was the same composition as the carbide disc and had also been treated with a TiCN/Al$_2$O$_3$ coating over the entire surface area. The grooves had an essentially semicircular cross-section with a diameter of about 4 mm. The cemented carbide disc was placed in a refractory metal cup. A treated plug that had been sprayed with hexagonal boron nitride was placed into the center hole of the disc and both sides covered with a copper strip to ensure that no contaminates got into the clearance area between the disc and plug. The grooves were then filled with a cBN powder mixture with a composition corresponding to Megadiamond commercial grade MN50 or MN90, and after that the disc and plug was sealed and treated at a high temperature/high pressure process, according to U.S. Pat. No. 5,115,697. After cooling, the inserts were recovered and processed in a solution of liquid KOH to remove the Nb can. The plug in the center of the disc was pressed out of the insert with a hydraulic press at less than 500 psi gauge pressure.

EXAMPLE 3

A cemented tungsten carbide cylinder disc was prepared with a composition WC+16 wt % Co with a diameter from 20–22 mm and a thickness of about 6 mm and a central hole with a diameter of 3.8–5 mm and with 2–4 grooves equidistantly located along the peripheral surface of the blank. The cemented carbide disc was coated with TiCN/Al$_2$O$_3$ over entire surface area of the blank. The plug that was placed in the center was a solid niobium plug with no other coating on the surface. The grooves had an essentially semicircular cross-section with a diameter of about 4 mm. The cemented carbide disc was placed in a refractory metal cup. The grooves were then filled with a cBN powder mixture with a composition corresponding to Megadiamond commercial grade MN50 or MN90, and after that the disc and plug were sealed and treated at a high temperature/high pressure process according to U.S. Pat. No. 5,115,697. After cooling, the inserts were recovered and processed in a solution of liquid KOH to remove the Nb can. The plug in the center of the disc was pressed out of the insert with a hydraulic press at less than 500 psi gauge pressure.

As demonstrated above, embodiments of the invention are capable of producing an abrasive structure or a cutting insert with a hole formed therein. The abrasive structure or cutting insert includes a substrate and a superhard material which is bonded to the substrate. The hole is formed before the superhard material is bonded to the substrate in a high pressure/high temperature process. In the present embodiments, the hole is advantageously preserved by use of a plug which can be easily removed after the high pressure/high temperature process. As a result, there is no need to use electrodischarge machining to form the hole. Therefore, it is more cost-effective. Furthermore, it is also possible to form multiple cutting edges in a single high pressure/high temperature process. Consequently, it is possible to manufacture abrasive structures or cutting inserts with multiple cutting edges and a hole formed therein.

While the invention has been disclosed with respect to a limited number of embodiments, other numerous modifications and variations therefrom are possible. It is intended that the appended claims cover all such modifications and variations as fall within the true spirit and scope of the invention.

What is claimed is:

1. A method for making an abrasive structure with a hole, the abrasive structure having a substrate and a superhard material bonded together, comprising:

obtaining a substrate with a hole formed therein;

obtaining a plug having a body of a first material coated with a layer of a separating material, the separating material having a different composition from the first material;

positioning the plug inside the hole of the substrate, thereby forming an assembly;

placing a superhard material immediately adjacent to a surface of the substrate; and subjecting the assembly and the superhard material to a pressure exceeding approximately 30 kilobars and a temperature exceeding approximately 1000° C.

2. The method of 1, further comprising:

spraying a hexagonal boron nitride powder to cover at least a portion of the layer of the separating material prior to positioning the plug inside the hole of the substrate.

3. The method of claim 1, further comprising:

attaching a non-carbide-forming metal disc to cover the hole after the superhard material is placed immediately adjacent to a surface of the substrate.

4. The method of claim 1, wherein the substrate is formed of a second material, and the compressibility of the second material is approximately equal to or greater than the compressibility of the first material.

5. The method of claim 1, further comprising:

removing the plug from the hole of the substrate.

6. The method of claim 1, wherein the first material includes one of cemented tungsten carbide, ceramics, cermets, graphite, and niobium.

7. The method of claim 1, wherein the separating material includes one of copper, aluminum, niobium oxide, and zirconium oxide.

8. The method of claim 1, wherein the separating material includes TiCN and Al$_2$O$_3$.

9. The method of claim 1, wherein the superhard material includes one of diamond and cubic boron nitride.

10. The method of claim 1, wherein the surface of the substrate is coated with the separating material.

11. The method of claim 3, wherein the non-carbide forming metal includes one of aluminum and copper.

12. A method for making an abrasive structure with a hole, the abrasive structure having a substrate and a superhard material bonded together, comprising:

forming a cemented tungsten carbide blank with a hole therein;

making a plug having a body of a cemented tungsten carbide material coated with a layer of TiCN and Al$_2$O$_3$;

spraying a hexagonal boron nitride powder to cover at least a portion of the TiCN and Al$_2$O$_3$ layer;

positioning the plug inside the hole of the cemented tungsten carbide blank;

placing diamond powder immediately adjacent to a surface of the substrate;

attaching a copper disc to cover the hole, thereby forming a cell assembly;

subjecting the cell assembly to a pressure exceeding approximately 30 kilobars and a temperature exceeding approximately 1000° C.; and removing the plug from the hole.

13. A method for making an abrasive structure with a hole, the abrasive structure having a substrate and a superhard material bonded together, comprising:

forming a cemented tungsten carbide blank with a hole therein;

making a plug having a body of a cemented tungsten carbide material coated with a layer of TiCN and $Al_2O_3$;

spraying a hexagonal boron nitride powder to cover at least a portion of the TiCN and $Al_2O_3$ layer;

positioning the plug inside the hole of the cemented tungsten carbide blank;

placing boron nitride powder immediately adjacent to a surface of the substrate;

attaching a copper disc to cover the hole, thereby forming a cell assembly;

subjecting the cell assembly to a pressure exceeding approximately 30 kilobars and a temperature exceeding approximately 1000° C.; and removing the plug from the hole.

\* \* \* \* \*